Jan. 28, 1941.　　　A. ORDORICA　　　2,230,009
ANTIGLARE GLASSES
Filed Sept. 20, 1939　　　3 Sheets-Sheet 1
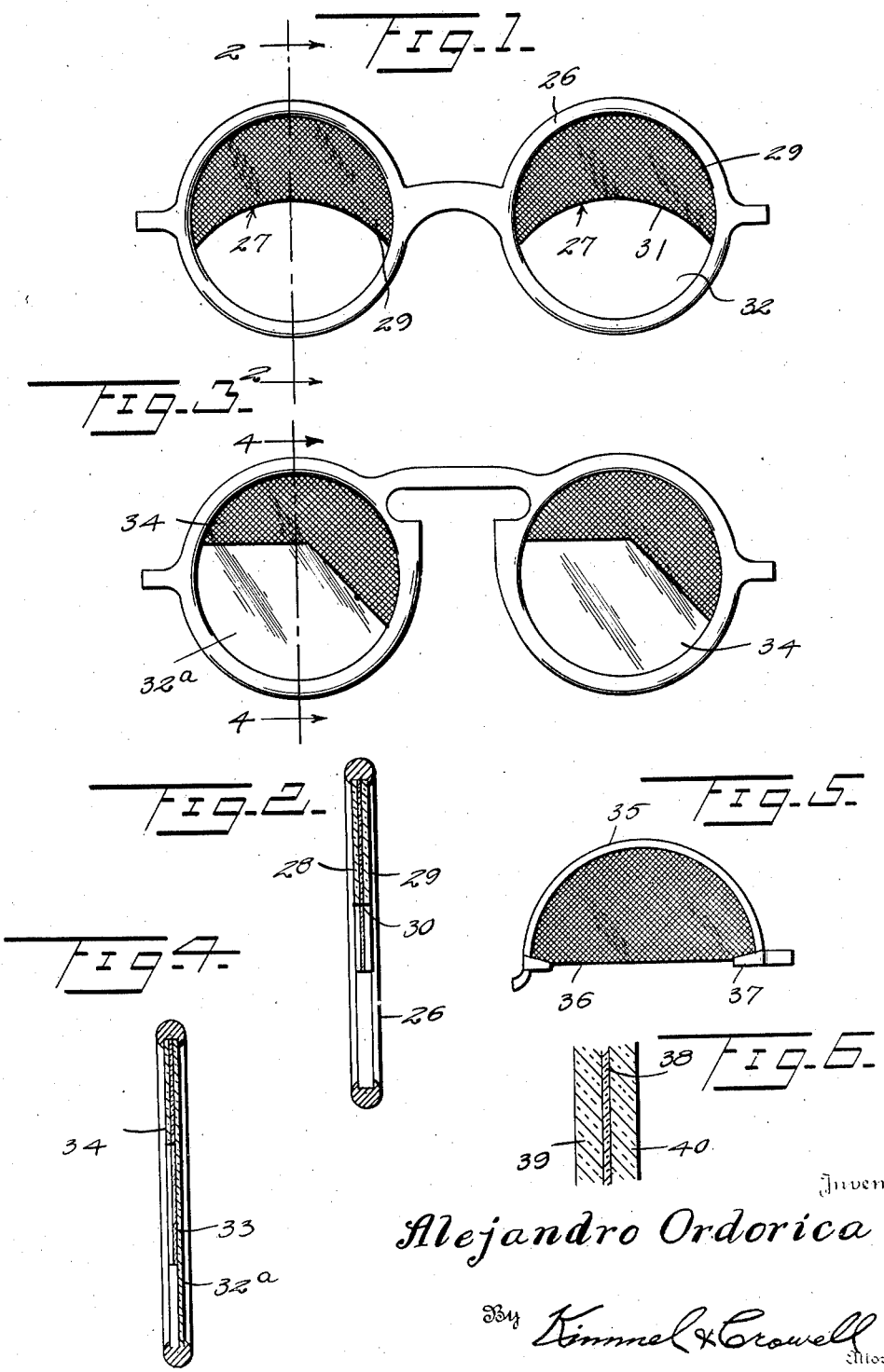
Inventor
Alejandro Ordorica
By Kimmel & Crowell
Attorneys Jan. 28, 1941.  A. ORDORICA  2,230,009
ANTIGLARE GLASSES
Filed Sept. 20, 1939   3 Sheets-Sheet 2
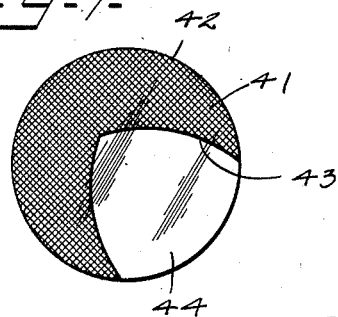
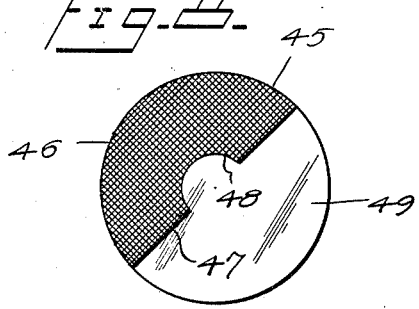
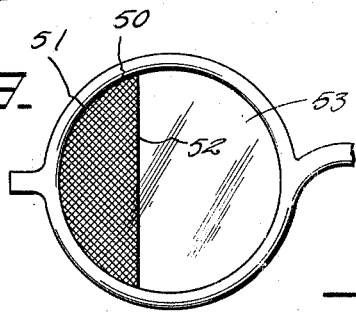
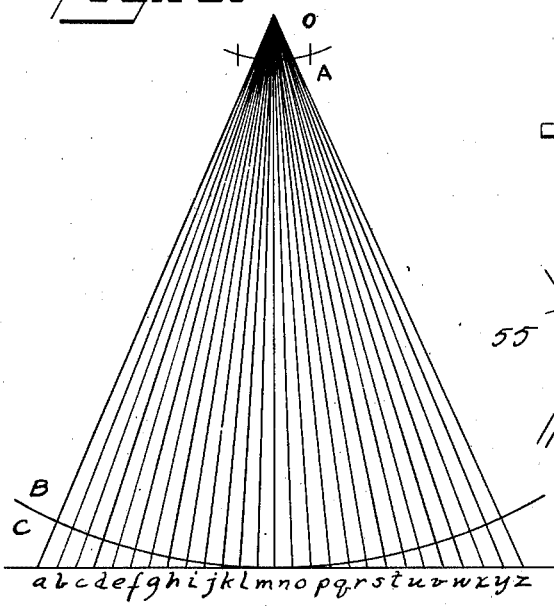
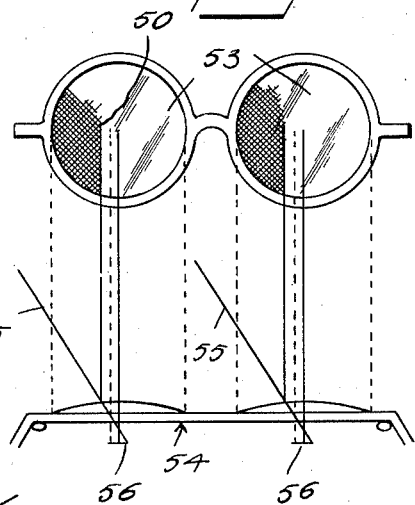
Inventor
Alejandro Ordorica
By Kimmel & Crowell
Attorneys Jan. 28, 1941. A. ORDORICA 2,230,009
ANTIGLARE GLASSES
Filed Sept. 20, 1939 3 Sheets-Sheet 3
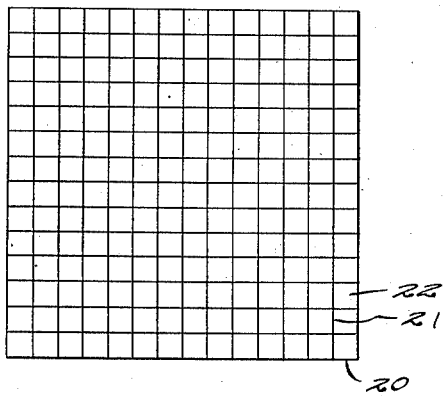
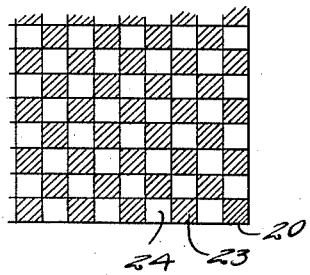
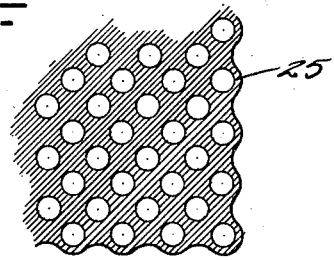
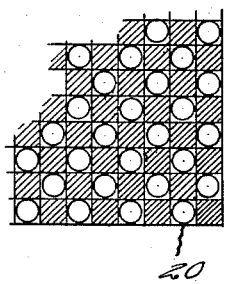
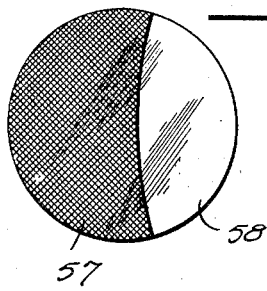
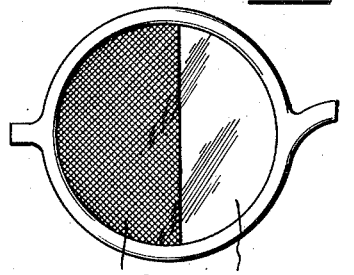
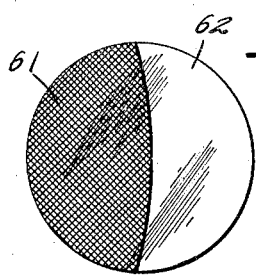
Inventor
Alejandro Ordorica
By Kimmel & Crowell
Attorneys Patented Jan. 28, 1941

2,230,009

UNITED STATES PATENT OFFICE 2,230,009

ANTIGLARE GLASSES

Alejandro Ordorica, Mexico, D. F., Mexico, assignor to Gaff-Mex, Mexico, D. F., Mexico, a corporation of Mexico Application September 20, 1939, Serial No. 295,825
In Mexico October 27, 1938

2 Claims. (Cl. 88—41)

This invention relates to antiglare glasses.

An object of this invention is to provide a structure which is so constructed as to provide a neutralization of the glaring light rays.

Heretofore, in the formation of antiglare glasses a screen or perforate body has been used to eliminate glaring light rays, but such structures have been found impractical because on the one hand they impaired clear vision and on the other hand they did not diverge the light or neutralize the glaring light rays. Where a metallic screen or perforate plate was used, the wires or the spaces between the perforations cast shadows rather than form a neutralizing means for the projected rays. It is, therefore, another object of this invention to provide an antiglare means for glasses which includes the combination of transparent and translucent portions so as to thereby eliminate shadows and produce a clarified vision.

A further object of this invention is to provide a structure which may be impressed or engraved on the lens or which may be produced on a flexible sheet and adhesively secured to a face of the lens or between a pair of transparent bodies forming the lens.

Embodying the foregoing aims and others which may hereinafter appear, the invention consists of the novel construction, combination and arrangement of parts as will be more specifically referred to and as illustrated in the accompanying drawings wherein is illustrated an embodiment of this invention, but it is to be understood that changes, variations and modifications may be resorted to which fall within the scope of the invention as claimed.

In the drawings:

Figure 1 is a detail front elevation of a pair of glasses or spectacles constructed according to an embodiment of this invention, Figure 2 is an enlarged sectional view taken on the line 2—2 of Figure 1, Figure 3 is a detail front elevation of another pair of glasses having an antiglare screen associated therewith of a different configuration than that shown in Figure 1, Figure 4 is an enlarged sectional view taken on the line 4—4 of Figure 3, Figure 5 is a fragmentary front elevation of another form of antiglare structure embodying this invention, Figure 6 is an enlarged fragmentary sectional view taken through a portion of the antiglare screen, Figure 7 is a detail front elevation of one lens having an antiglare screen associated therewith, the screen being provided with a substantially parabolic clear space, Figure 8 is a lens providing a further configuration of glare screen, Figure 9 is a fragmentary front elevation of another lens structure embodying this invention, Figure 10 is a diagrammatic view showing the projection of light rays from a convex lens structure, Figure 11 is a detail front elevation an a projection of the figure in top plan of a spectacle or glass embodying this invention, Figure 12 is a graph showing the method of producing a glare screen, Figure 13 is a fragmentary view similar to Figure 12, but having alternate squares filled in, Figure 14 is a fragmentary enlarged view of the completed screen.

Figure 15 is a view showing a further step in producing the glare screen,

Figure 16 is a fragmentary front elevation of a further type of screen and lens, Figure 17 is a glare screen associated with a concave lens, and Figure 18 is a glare screen associated with a convex lens.

Referring to the drawings and first to Figures 12 to 15 inclusive in the production of a glare screen embodying this invention a graph was used as shown in Figure 12 embodying horizontal lines 20 and vertical lines 21 forming squares 22. After the squares 22 have been formed alternate squares are filled in as at 23 thereby producing a substantially checker-board design. The unfilled squares 24 shown in Figure 13 are then inscribed by a circle 25 and the space outside of the circle 25 was then filled in producing the structure as shown in Figure 14. From this design a reduction was taken to construct a photoengraving cliche reproducing in it 24 circumferences for each lineal centimeter. The cliche was mounted on a steel structure instead of wood as is commonly done in order to provide a neat drawing, permit application of special ink and hard stresses developed by the impression on the special material used in the formation of the screen which is similar to Celluloid.

With the cliche construction in accordance with the method above indicated several sheets of pyralin were engraved under a special press. Pyralin was chosen because it is as translucent and transparent as glass. The pyralin was placed between two plain thin glasses of no graduation so as to form the binoculars of the antiglare structure. The procedure adopted in the impression of the pyralin may also be useful in Cellophane, mica, Celluloid, or other flexible transparent material, but it only being necessary that the material be transparent. All the materials that have been enumerated might be used as the binoculars of the antiglare glasses by themselves, but it is impractical to do so because of the deteriorating characteristics of these materials which would make them lose their antiglare design properties. This is one of the reasons why it is more desirable to intercalate the pyralin between the two lenses. It will also be understood that the screen may be produced by engraving on the lens or crystal.

In Figure 10 there is illustrated a horizontal projection of a lens A having a convex outer side which was used in arriving at one of the calculations in the production of the glare screen. Assuming that line B is parallel to A and C is normal to the focal axis of the lens and tangent to B, the spaces ab, bc, etc., will represent what would be covered by a millimeter along the horizontal axis of the lens to a certain proportion.

In Figure 1 there is disclosed a lens mount or frame structure including lens rims 26 and an antiglare screen generally designated as 27 which is mounted within the rim 26. This screen 27 comprises a pair of inner and outer lens members 28 and 29 and an antiglare screen member 30 which is interposed between the inner faces of the two lens members 28 and 29 and which may be adhesively secured to these lens members in any desired manner. The external configuration of the lens members 28 and 29 is described on a circle and the inner edges of the two members 28 and 29 are formed on a concave as at 31 thereby providing a clear or transparent lower portion 32. This clear portion 32 in the present instance is free of a lens structure, but if desired a suitable lens may be positioned in the clear space 32. The structure shown in Figure 1 includes a glare screen of substantially crescent-shape, but this particular configuration may be varied depending on the conditions encountered or which it is desired to overcome.

In Figure 3 there is disclosed another configuration of a screen structure wherein a full lens 32ᵃ is provided having on one face thereof a glare screen 33 and a fragmentary lens member 34. This lens member 34 and the screen member 33 are cut on obtusely related lines as shown in Figure 3.

In Figure 5 there is disclosed another form of glare screen wherein a fragmentary piece of eye wire or frame member 35 is provided, this member 35 being semi-circular in front elevation and a semi-circular glare screen member 36 is secured in the eye wire 35 by means of inwardly projecting clips or holding members 37. The screen 36 is constructed after the manner disclosed in Figure 15 and is of the same construction as shown in Figures 1 to 4 inclusive.

In Figure 6 there is disclosed an enlarged fragmentary sectional view showing the interposition of a screen member 38 between a pair of lens members 39 and 40. These lens members 39 and 40 may be of any suitable perimeter and may have any desired configuration on the front and rear faces thereof. In other words, while the lens members 39 and 40 are shown as being provided with parallel opposite faces it will be understood that the faces of these lens members may be concave, convex, double concave, double convex, or of concavo-convex configuration.

In Figure 7 there is disclosed a further form of lens and screen structure wherein the screen member 41 is provided with a circular outer margin 42 and is provided with a substantially parabolic inner margin 43 thus leaving a clear or transparent space 44.

In Figure 8 there is also disclosed a further configuration of lens structure wherein the screen 45 is provided with a circular perimeter 46 and a straight inner edge 47 which is drawn as a diameter of the outer marginal edge 46. An arcuate inner margin 48 is formed in the central portion of the screen member 45 which is drawn on the same axis as the axis of the outer margin 46. The remaining portion of the lens 49 is clear or transparent.

In Figure 9 there is also disclosed a further configuration of screen structure 50 having an arcuate outer margin 51 and a straight inner margin 52 which is drawn as a chord of the arc 51. The remaining portion 53 of the lens structure is clear or transparent and preferably the chord 51 is disposed in a vertical position so as to thereby dispose the screen 50 in one side of the center of the lens.

In Figure 11 there is disclosed a complete spectacle structure embodying the lens shown in Figure 9. In Figure 11 the lens has been projected as shown at 54 and the lines 55 indicate the angle of the light projection passing over the straight edge portion 52 of the screen 50. The point 56 indicates the point at which the light rays will strike the eye after passing through the glare portion 50 of the lens. A structure of this kind is particularly useful where the road has a number of curves and the curves are to the left of the driver of a vehicle.

In Figure 16 there is disclosed a further configuration of screen structure 59 which is used with a lens 60 which is provided with parallel opposite faces. In this structure the screen 59 is substantially greater than one-half the area of the lens 60.

In Figure 17 there is disclosed a further configuration of glare screen structure 57 which is used with a concave lens 58. In this structure the glare screen 57 is substantially larger than one-half the diameter of the lens 58.

As heretofore stated it is well known that antiglare members or glasses have been constructed with metal screen or perforated plates, but screens of this type are impractical in view of the fact that the wires forming the mesh screen produce shadows and the unperforated portions of a perforated plate also produce shadows. In the production of this invention the material of which the screen is constructed is primarily transparent and the spaces which are heretofore indicated as being filled in are of translucent material. It is important that the areas of the circles be completely transparent so as to admit the parallel light rays therethrough. The glare screen heretofore described may be engraved or imposed on a transparent body and if imposed on the transparent body through the medium of light sensitive material it is necessary that the sensitive material be removed from the area within each circle. A screen construction according to this invention will neutralize the glaring light rays and will, therefore, provide a screen structure which will permit a person to look therethrough into glaring lights without becoming blinded thereby.

Figure 18 shows a further type of glare screen and lens structure wherein the lens 62 has an outer convex surface and a glare screen member 61 is adhesively fixed to this lens. The screen 61 has an inner convex edge and the area of the screen 61 is substantially greater than one-half of the area of the lens 62.

What I claim is:

1. An antiglare spectacle comprising in combination a pair of lens members and a screen member interposed between and adhesively to said members, said screen member comprising a flexible sheet formed on one surface thereof with transparent circular portions and translucent portions between said circular portions, said sheet having an area substantially less than the area of said lens members whereby a substantial portion of said members will transmit unscreened light rays.

2. An antiglare spectacle comprising in combination a lens member and a light ray filter screen fixed to one face thereof, said screen comprising a flexible sheet formed on one surface thereof with transparent circular portions and translucent portions between said circular portions, said sheet having an area substantially less than the area of said member whereby a substantial portion of said member will transmit unscreened light rays.

ALEJANDRO ORDORICA.